United States Patent [19]

Komatsubara et al.

[11] Patent Number: 4,887,273
[45] Date of Patent: Dec. 12, 1989

[54] INTERCALATION COMPOUND AND GENERATOR OF COHERENT RADIATION USING THE SAME

[75] Inventors: Kiichi Komatsubara, Tokorozawa; Seiichi Tanuma, Kiryu; Katsuya Okabe, Ota; Toshio Katsuyama, Hachioji, all of Japan

[73] Assignee: Hitachi, Ltd., Tokyo, Japan

[21] Appl. No.: 844,555

[22] Filed: Mar. 25, 1986

[30] Foreign Application Priority Data

Mar. 27, 1985 [JP] Japan .................................. 60-60691
May 22, 1985 [JP] Japan ................................ 60-108128

[51] Int. Cl.$^4$ .............................................. H01S 3/16
[52] U.S. Cl. ........................................ 372/41; 372/39; 372/5
[58] Field of Search .................... 372/5, 39, 41, 66, 68

[56] References Cited

U.S. PATENT DOCUMENTS 3,967,213 6/1976 Yariv ........................................ 372/5
4,604,276 8/1986 Oblas et al. .......................... 252/507
4,664,849 5/1987 Farrington et al. ................... 372/39

Primary Examiner—Léon Scott, Jr.
Attorney, Agent, or Firm—Antonelli, Terry & Wands

[57] ABSTRACT

An intercalation compound obtained by intercalating a halide of sodium or an element belonging to the group IV of the periodic table such as NaBr, SiCl$_4$, etc., in a layer crystal substance such as graphite is suitable as an optical resonator in a device for emitting coherent radiation together with an exciting energy supplying means which can radiate synchroton radiation or plasma focus X-rays, particularly in an X-ray laser for emitting X-rays having a wavelength of 10 Å or less.

17 Claims, 6 Drawing Sheets

INTERCALATION COMPOUND AND GENERATOR OF COHERENT RADIATION USING THE SAME

BACKGROUND OF THE INVENTION

This invention relates to intercalation compounds and a generator of coherent radiation using the same. More particularly, this invention relates to intercalation compounds obtained by intercalating halides of elements belonging to the group IVa of the periodic table or sodium in layer crystal substances and having excellent properties in crystal characteristics, electric conductivity, electric dielectricities, heat conductivity, etc., and also relates to solid state coherent radiation equipment using such an intercalation compound particularly suitable for emitting coherent X-rays.

Heretofore, as layer crystal substances, there have been known diamond and graphite consisting of carbon atoms. On the other hand, layer crystal substances cannot be theoretically formed from Si, Ge and the like which are known as semiconductor substances. Thus, various studies have been made as to intercalation compounds obtained by intercalating other atoms or compounds among sheets of carbon atoms of graphite. But there has been no report as to the intercalation of the elements of the group IVa of the periodic table and halides thereof.

As to generators of coherent radiation using a solid, there have been known semiconductor lasers. But the wavelength of coherent radiation is mainly 750 nm to 1.5 μm and equipment emitting other wavelengths has not been known, particularly coherent X-rays having a wavelength of 10 Å or less.

SUMMARY OF THE INVENTION

Objects of this invention are to provide an intercalation compound formed by controlling the number of atom layer used as a host or the number of molecule layer used as an intercalant, particularly to provide an intercalation compound obtained by intercalating a halide of an element belonging to the group IVa or sodium in a layer crystal substance such as graphite, a process for producing the same, and a device for emitting coherent radiation.

This invention provides an intercalation compound comprising a group of at least one atom layer (atom stage) as a host for forming a layer crystal substance and a group of at least one molecule layer (molecule stage) of a compound as an intercalant, both groups being positioned alternately, the number of said atom layer being one or more, and said compound being one member selected from the group consisting of halides of elements belonging to the group IVa of the periodic table and sodium halides.

This invention also provides a process for producing the intercalation compound mentioned above which comprises intercalating a compound in a layer crystal substance with heating in a gaseous atmosphere containing the compound to be intercalated.

This invention further provides a device for emitting coherent radiation by using the intercalation compound mentioned above.

DESCRIPTION OF THE PREFERRED EMBODIMENTS

The intercalation compounds of this invention comprise a group of at least one atom layer as a host for forming a layer crystal substance and a group of at least one molecule layer of a compound as an intercalant, both groups being positioned alternately.

As the layer crystal substance, there can be used graphite, GaS, InS, InSe, $HgI_2$, and $PbI_2$.

As the intercalant, there can be used halides of elements belonging to the group IV of the periodic table, particularly the group IVa, i.e., Si, Ge, Sn, Pb, and halides of sodium. As the halides, there can be used chlorides, bromides, iodides, and fluorides. When Si, Ge, Sn, Pb, or Na alone is intercalated in graphite, it is not positioned at the centers of hexagons of carbon atoms constituting graphite, which results in causing strains in the crystal to destroy it. In contrast, when the elements belonging to the group IVa and Na are intercalated in the form of compounds of halides thereof, these compounds can be positioned at the centers of hexagons of carbon atoms to stabilize the resulting intercalation compound. Among these halides, $SiCl_4$, $GeCl_4$, $SnCl_4$, $PbCl_4$, $NaBr$, $GeBr_4$, $NaCl$ are preferable.

Figure 4:
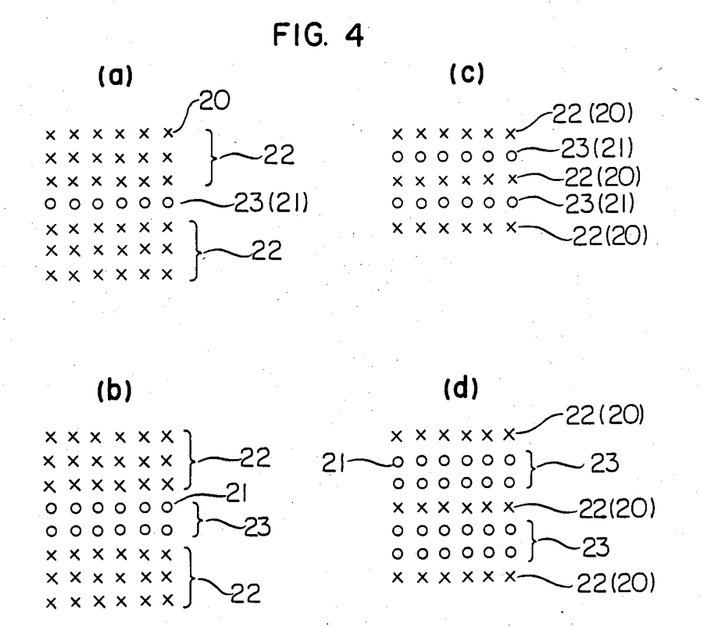
FIGS. 4 and 6 are schematic cross-sectional views showing the structures of intercalation compounds of this invention.

The intercalation compound of this invention has a structure, for example, as shown in FIGS. 4(a) to 4(d), wherein 22 is a group of at least one atom layer, 23 is a group of at least one molecule layer, 20 is an atom (e.g. carbon atom) for forming a layer crystal substance (e.g. graphite shown by a mark X) and 21 is a compound intercalated (shown by a mark o). As shown in FIG. 4, the number of atom layer can be one as shown in FIGS. 4(c) and 4(d) or three as shown in FIGS. 4(a) and 4(b), but, needless to say, the number can be two or others. Further, the number of molecule layer ca be one as shown in FIGS. 4(a) and 4(c) or two as shown in FIGS. 4(b) and 4(d), but needless to say, other numbers may be used. In this invention, one layer is called "a stage" and an assemblage of layers is called "a group".

The intercalation compound of this invention can be produced by placing the layer crystal substance such as graphite in an atmosphere of vapor of the intercalant, i.e., a halide of Na or an element belonging to the group IV, or placing the layer crystal substance in an atmosphere of vapor of the intercalant and a halogen gas such as chlorine gas, bromine gas, etc. The latter process is particularly better for extremely stably intercalating a halide of Na or an element belonging to the group IVa in graphite, particularly intercalating SiCl₄ using Cl₂ gas or intercalating NaBr using Br₂ gas.

In order to intercalate the halides of Na or a group IV element in graphite, the compound to be intercalated and graphite are placed in a reaction vessel as shown in FIG. 1, 2, 3, 12 or 13 and heated at a temperature of 100° to 500° C., preferably 150° to 400° C. After the intercalation, the reaction vessel is compulsorily cooled preferably to a supercooled state in order to prevent the release of the intercalated compound during the cooling. Further, when the cooling is carried out too rapid by, there is a fear of causing cracks in the crystal. Therefore, it is preferable to use a faster cooling rate than the heating rate (a temperature rise rate) employed above. For example, the cooling rate is preferably 0.1° to 10° C./min to give particularly stable intercalation compounds. In the case of intercalating $SiCl_4$, NaBr or $GeBr_4$, the cooling rate of 0.5° to 2° C./min is particularly preferable.

Figure 9:
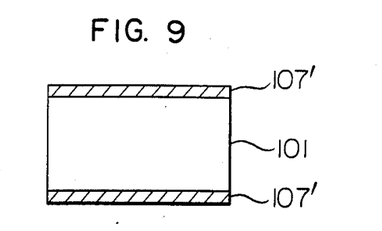
Figure 10:
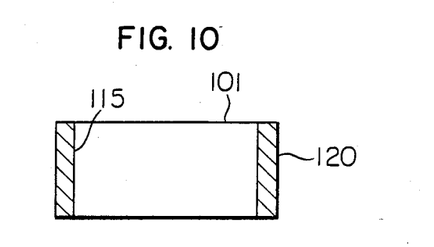
FIGS. 10 and 11 are cross-sectional views showing intercalation compounds of this invention covered with a coating.
Figure 11:
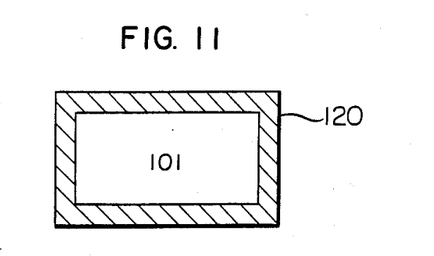

In order to improve the stability of the intercalation compound of this invention, it is possible to cover it with a covering. As the covering material, there can be used an inorganic material such as boron nitride (BN), silica ($SiO_2$), etc., and an organic resin such as a polyimide resin, etc. Such a covering can be formed directly on side faces perpendicular to the atom layer of the intercalation compound as shown in FIG. 10, or on front and back faces parallel to the atom layer of the intercalation compound as shown in FIG. 9. Further, as shown in FIG. 11, the whole surfaces of the intercalation compound can be covered with a covering. In the case shown in FIG. 10, since there is no covering at the faces paralel to the atom layer of the intercalation compound, the loss of excitation energy and radiation is small but there is a tendency to cause a pollution problem. In the case of FIG. 11, it is preferable to use a covering material low in absorption of excitation energy and radiation. Needless to say, a covering material for the faces parallel to and that for the side faces perpendicular to the atom layer of the intercalation compound may be different.

In the case of intercalating a halide of Si, when H₂0 is present in the atmosphere for heating the layer crystal compound such as graphite, a film of $SiO_2$ is formed on the surface of the resulting intercalation compound. Said $SiO_2$ film can be a covering for improving the stability.

The material for the covering and the thickness of the covering should be selected properly so as not to damage the effects of this invention due to too much absorption of pumping energy.

The intercalation compounds of this invention have excellent properties, for example, that obtained by intercalating SiCl₄ in graphite is large in photoconductivity and strong in anisotropy in the photoconductivity, that obtained by intercalating GeCl₄ is large in electric conductivity, that obtained by intercalating SnCl₄ or PbCl₄ is high in a critical temperature as to superconductivity.

By using the intercalation compounds of this invention, there can be formed various novel electrical elements and devices by properly selecting the shape of intercalation compounds. For example, there can be obtained a photo detecting element having anisotropy by applying properties of having a large anisotropy in photoconductivity, a highly precise thermometer by applying properties of inverting the mark of positive and negative of the Hall coefficient at certain temperatures, a temperature sensitive element by properly selecting the shape, a solid-state X-ray laser by applying a function as a diffraction grating, and the like by using the intercalation compounds of this invention.

As to the X-ray laser, since the distance between the molecule layer takes a predetermined value in the intercalation compound of this invention, this can be regarded as a periodic distributed feedback structure; and thus it is possible to take place X-ray laser action having a wavelength corresponding to such a distance. Further, since the distance between the molecule layers or the groups of molecule layers can be changed depending on the conditions for producing samples, it is possible to realize X-ray laser beams having various wavelengths.

Figure 5:
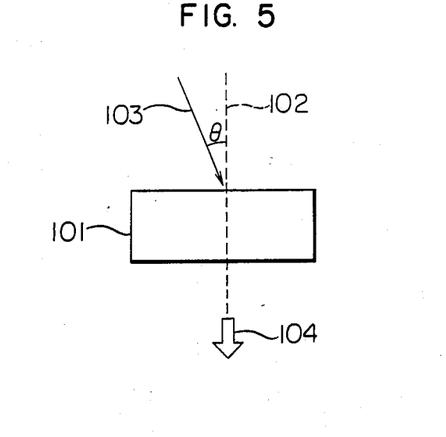
FIGS. 5, 7 and 14 are schematic cross-sectional views showing devices for emitting coherent radiation by using the intercalation compounds of this invention.

In addition, by using the intercalant compound of this invention, there is provided a novel laser as shown in FIG. 5. In FIG. 5, numeral 101 denotes the intercalation compound of this invention, numeral 102 a perpendicular line to the atom layer in the intercalation compound, numeral 103 a vector showing exciting energy, numeral 104 coherent radiation, and $\theta$ is an angle between the perpendicular line 102 and the incident direction of exciting (or pumping) light 103.

The present inventors noted that the transmittance of light through a substance is proportional to the cube of the Z number of the element constituting the substance and that a layer crystal substance consisting of an element having a small atomic weight such as graphite is transparent. When exciting energy is supplied to an intercalation compound having intercalated molecule layers of a compound containing an element having a larger atomic weight such as Si between the atom layers of graphite so as to excite the core electrons of the element constituting the intercalation compound, there takes place a resonance action for macroscopic fluorescence X-ray (6.6 Å) generated at the time of relaxation of the layers of the intercalation compound due to the slowness of the relaxation of a macroscopic dipole correlation of the layers forming the group of molecule layers compared with the case of monomolecule layer, and coherent electromagnetic waves are generated similar to a classical case of cavity resonance. When the layer crystal substance is graphite, the wavelength of the generated electromagnetic waves becomes 6.6 Å.

Further, when the pumping power becomes large, there takes place population inversion of electrons to provide a super radiant X-ray laser. This is a kind of traveling-wave type laser.

Figure 6:
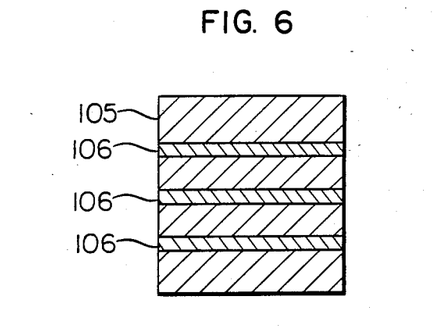

The intercalation compound used in such a laser has a structure as shown in FIG. 6, wherein numeral 105 denotes an atom layer of monocrystal of layer crystal substance such as graphite and three layers 106 of molecule layer of intercalated compound are interposed therebetween. A single molecule layer of intercalation compound is easily intercalated between the atom layers, but a plurality of molecule layers (a group of molecule layers) can be intercalated between the atom layers. Since the absorption coefficient of atom for a beam of radiation having a certain wavelength is proportional to the cube of the atomic number (Z), a beam of radiation, particularly X-rays, is hardly absorbed in the carbon atom layer (C: Z=6), which is, therefore, regarded as transparent. When the molecule layer is consisted of elements such as Si (Z=14) or Ge (Z=32) and Cl (Z=17), electrons of these elements are excited, and a beam generated at the time of relaxation thereof resonates in a resonator constituted by the intercalation compound to generate a standing wave. When the pumping power becomes larger than the threshold, a super radiant is generated. Thus, a laser action is admitted in the intercalation compound.

Extremely stable optical resonators can be obtained when acceptor type intercalation compounds, which are obtained by using as the compound for forming the molecule layer halides of Na and elements belonging to the group IVa, are used.

Figure 8:
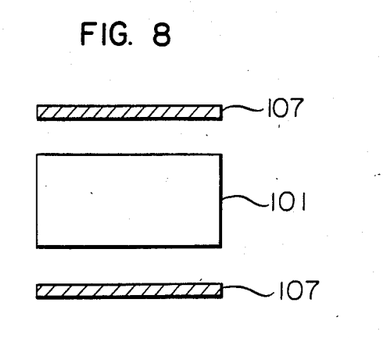
FIGS. 8 and 9 are schematic cross-sectional views showing optical resonators using an intercalation compound of this invention.

A laser action is also found when there is used an optical resonator as shown in FIG. 8, wherein numeral 101 is the intercalation compound of this invention and numeral 107 is a crystal layer of an element belonging to the group IVa such as Si, etc., or Na.

The resonance wavelength of the optical resonator can be obtained theoretically from lattice spaces and electron states of constituting substances such as graphite, the IV group elements, Na, element and halogen atoms, and the structure of the intercalation compound (the state of intercalation such as the distance between the two molecule layers). For example, the wavelength is 6.6 Å when $SiCl_4$ is intercalated every three layers of the atom layers of graphite, and 2.9 Å when NaBr is intercalated every three layers of the atom layers of graphite.

Further, since X-rays having a wavelength of 35 Å or less can transmit through air, detecting devices with high performance for medical use or industrial use, with small size and light weight can be realized while applying features of coherent X-rays.

According to this invention, since elements which have been regarded as impossible for intercalation can be intercalated to give novel intercalation compounds having new properties, various electrical elements and devices having new function such as highly sensitive photo detecting elements, thermometers, X-ray lasers, etc., can be produced by using such intercalation compounds.

Further, since coherent X-rays having a wavelength of 10 Å or less can be obtained in this invention, there can be constructed a steric laser X-ray CT device, X-ray steric measuring device, etc., which may give remarkably great effects socially and economically.

This invention is illustrated by way of the following Examples.

EXAMPLE 1

Figure 1:
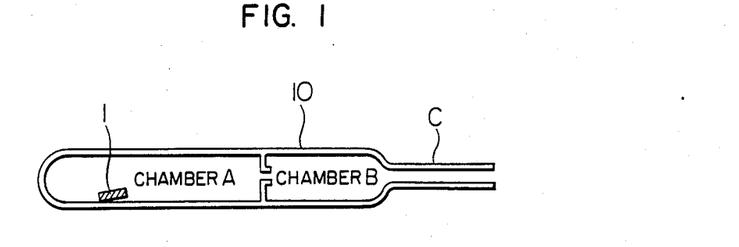
FIGS. 1, 2, 3, 12 and 13 are schematic cross-sectional views showing apparatuses for producing the intercalation compounds of this invention.
Figure 2:
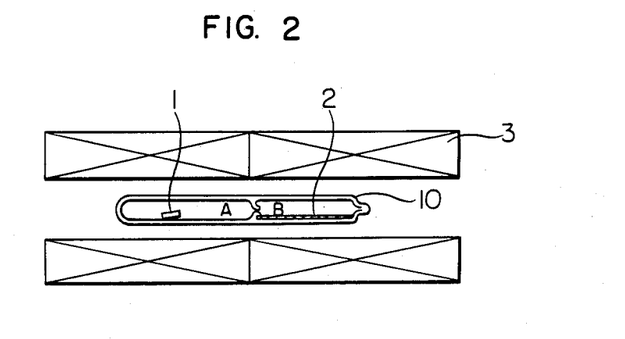

An intercalation compound was produced by using apparatuses shown in FIGS. 1, and 2. A graphite crystal 1 of single crystal of $20 \times 12 \times 1$ mm in size (obtained by pyrolysis of a hydrocarbon and annealed for a long time at high temperatures while pressed at the C-axis direction) was placed in chamber A of glass chamber 13 made of silica glass and 2 ml of $SiCl_4$ (2) (purity 99.999%) was poured into chamber B. The air in the glass chamber 10 was removed from a glass tube C, which was sealed by melting the glass tube. The glass chamber 10 was inserted into an electric furnace 3 as shown in FIG. 2. The chamber A containing the single crystal of graphite 1 was heated at 300° C. and the chamber B containing $SiCl_4$ (2) was heated at 270° C. After allowing to stand at this state for 10 days, the glass chamber 10 is cooled at a rate of 1° C./min.

The X-ray diffraction method of the resulting single crystal of graphite 1 showed that a molecule layer of $SiCl_4$ was intercalated in every three atom layers of carbon atoms of graphite.

The measurement of the Hall effect of this sample revealed that the hole density at room temperature was $3 \times 10^{19}$ cm$^{-3}$. When the temperature was lowered from room temperature, the inversion of the positive and negative marks of the Hall coefficient took place at 170° K and the electron density at 20° K was $1 \times 10^{19}$ cm$^{-3}$. Therefore, the measurement of temperature was possible from the Hall electron density and the positive or negative mark of Hall coefficient. In this case, the accuracy of measurement was extremely as high as ±0.001° K.

Other halides of elements belonging to the group IV were also able to be intercalated in graphite similarly. Intercalation compounds suitable for practical use were able to be produced by using the heating temperature of graphite ($T_G$) of 150° to 400° C., the heating temperature of the halides of 0° to 70° C. lower than the $T_G$, and the cooling rate of 0.1 to 10° C./sec.

EXAMPLE 2

Intercalation compounds were produced in the same manner as described in Example 1 by heating single crystal of graphite in the chamber A of the glass chamber 10 at 100° to 400° C. ($T_G$) and heating $SiCl_4$ in the chamber B at a temperature 0° to 70° C. lower than the $T_G$ in the electric furnace as shown in FIG. 2. The intercalation compounds having the same properties as those obtained in Example 1 were obtained when the heating time was 40 hours or longer.

EXAMPLE 3

Single crystal of graphite 1 was placed in the chamber A of the glass chamber 10 and $SiCl_4$ was poured into the chamber B shown in FIG. 1 in the same manner as described in Example 1. Then, $Cl_2$ gas was introduced into the glass chamber, followed by sealing of the glass tube C with heating. The same heating conditions as described in Example 2 were employed. As a result, an intercalation compound intercalating $SiCl_4$ and having the same properties as those obtained in Examples 1 and 2 was obtained.

The pressure of $Cl_2$ gas in the glass chamber at room temperature was preferable in the range of 400 to 600 Torr, but the intercalation of $SiCl_4$ was possible when the $Cl_2$ pressure was 2 atmospheres or lower.

EXAMPLE 4

The process of Example 1 was repeated except for using graphoil (graphite obtained by pyrolysis of a hydrocarbon, and having a domain structure in the c plain and being a polymorph good in orientation at the c-axis direction) in place of single crystal of graphite. An intercalation compound intercalating $SiCl_4$ having the same properties as those obtained in Examples 1 to 3 was obtained.

EXAMPLE 5

The process of Example 1 was repeated except for using $GeCl_4$ in place of $SiCl_4$ to give an intercalation compound intercalating $GeCl_4$.

EXAMPLE 6

The process of Example 1 or 3 was repeated except for using $SnCl_4$ in place of $SiCl_4$ to give an intercalation compound intercalating $SnCl_4$. In the case of repeating the process of Example 3, better results in the intercalation were obtained, when the $Cl_2$ gas pressure in the glass chamber was higher than that in Example 3.

The resulting intercalation compound had properties at the layer direction similar to those of metals and showed a large change in interlayer current depending on the voltage, light and pressure.

EXAMPLE 7

Figure 3:
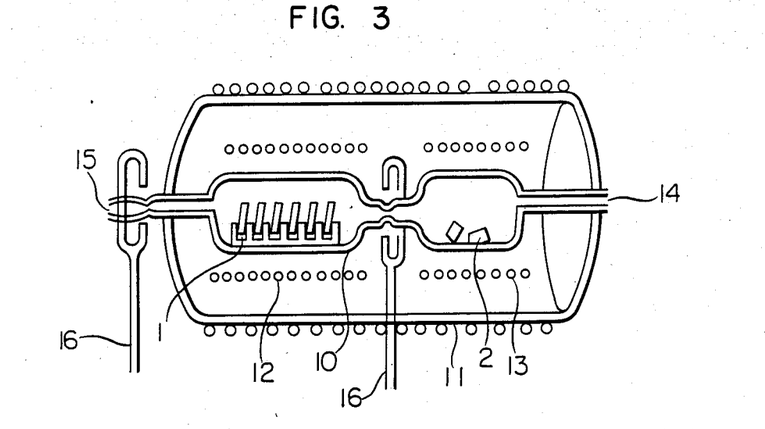

Single crystal of graphite 1 and 3 ml of $SiCl_4$ (2) were placed in a glass chamber shown in FIG. 3. The whole temperature was adjusted by a heater 11. Then, the temperature of graphite 1 was controlled at 200° C. by using a heater 12. $SiCl_4$ (2) was vaporized by using a heater 13 and moved to the graphite 1 by passing air from an air inlet 14. Numeral 15 was a gas outlet, and numeral 16 is a burner for sealing a gas outlet. Then, the temperature of graphite 1 was raised to 300° C. in one hour and maintained for another one hour. During said 2 hours, the $SiCl_4$ (2) seemed to be intercalated between atom layers of carbon atoms of graphite crystal 1. Then, the temperature of graphite 1 was lowered to 50° C. in 30 minutes by controlling the heaters 11, 12 and 13 and passing air, and to room temperature in 3.5 hours. The resulting intercalation compound was remarkably stable and very small in crystal defects, and showed strong anisotropy in photoconductivity.

EXAMPLE 8

Figure 7:
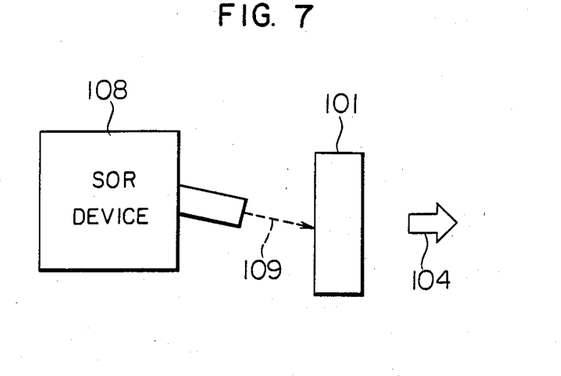

When an intercalation compound 101 obtained by intercalating $SiCl_4$ in single crystal of graphite was radiated with synchrotron radiation (SOR) 109 having a wavelength of 6.69 Å by using a SOR equipment 108 as shown in FIG. 7, coherent X-rays 104 having a wavelength of 6.6 Å was emitted. The angle between a line perpendicular to the atom layer of the intercalation compound 101 and incident direction of SOR was effective in the range of 0° to 40°. When the angle is larger than 40°, there takes place Bragg reflection, which results in making the incidence of SOR into the intercalation compound difficult.

As the X-ray source, it was also possible to use plasma focus X-rays other than SOR.

EXAMPLE 9

To an intercalation compound obtained by intercalating NaBr in graphite singlecrystal, X-rays were radiated as shown in FIG. 5. The X-rays were obtained from an X-ray generating means using Mo as target and had a wavelength of 2.27 Å.

EXAMPLE 10

A pair of Si layers 107 were positioned in parallel to the atom layer of an intercalation compound 101 obtained by intercalating $SiCl_4$ in single crystal of graphite as shown in FIG. 8 or a pair of Si layers 107' were formed on surfaces of the intercalation compound in parallel to the atom layer thereof as shown in FIG. 9.

The resulting devices were operated as optical resonator in individual cases.

When the thickness of Si layer was more than 10 atom layers, there was a tendency to lower the ability of resonance. Further, needless to say, the Si layer can be formed on some substrates.

EXAMPLE 11

A $SiO_2$ film 120 having approximately 1 μm of the thickness was formed on side faces of an intercalation compound 101 obtained by intercalating $SiCl_4$ in single crystal of graphite perpendicular to the atom layer as shown in FIG. 10. When this sample was radiated with X-rays having a wavelength of 6.69 Å, there were obtained coherent X-rays having a wavelength of 6.6 Å.

EXAMPLE 12

A polyimide resin film 120 was formed on the whole surfaces of an intercalation compound 101 obtained by intercalating $SiCl_4$ in single crystal of graphite as shown in FIG. 11. When this sample was radiated with X-rays having a wavelength of 6.69 Å, there were obtained X-rays having a wavelength of 6.6 Å.

EXAMPLE 13

Figure 12:
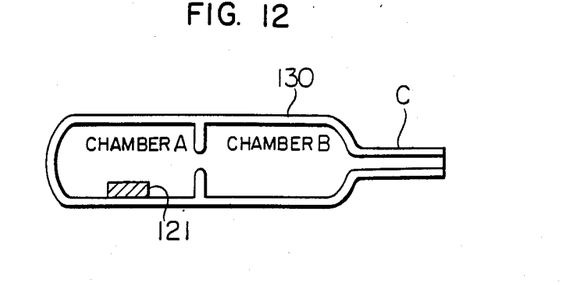
Figure 13:
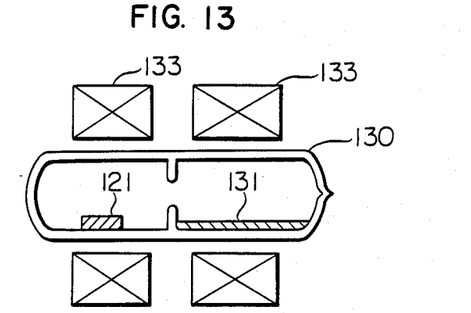

Single crystal of graphite 121 (obtained by pyrolysis of a hydrocarbon and annealed for a long time at high temperatures while pressed at the c-axis direction) was placed in the chamber A and 200 mg of NaBr powder was placed in the chamber B of a glass chamber 130 as shown in FIG. 12. The air in the glass chamber 130 was removed from a glass tube C, which was then sealed with heating. The glass chamber 130 was placed in an electric furnace 133 as shown in FIG. 13. The single crystal of graphite 121 was heated at 1000° C. and NaBr 131 was heated at 1100° C., and allowed to stand at this state for 20 days. Then, the glass chamber 130 was cooled to 100° C. at a rate of 2° C./sec and to room temperature at a rate of 0.5° C./sec to give an intercalation compound which was stable and suitable for use in a device for emitting coherent radiation.

Figure 14:
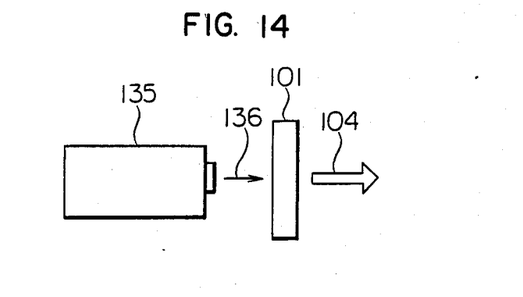

Using the intercalation compound 101, a device for emitting coherent radiation such as coherent X-rays 104 in combination with a special X-ray generating means 135 using Cr as target as shown in FIG. 14 was constructed. In FIG. 14, numeral 136 represents X-rays.

Intercalation compounds suitable for use in such a device was able to be produced by changing the heating temperature of graphite ($T_G$) in the range of 800° to 1500° C., the heating temperature of the halide such as NaBr in the range of 0° to 200° C. lower than the $T_G$, and the cooling rate in the range of 0.5° to 20° C./sec.

What is claimed is:

1. A device for emitting coherent radiation comprising: an optical resonator containing an intercalation compound comprising a group of at least one atom layer as a host for forming a layer crystal substance and a group of at least one molecule layer of a compound as an intercalant, said compound as an intercalant being selected from the group consisting of $SiCl_4$, $GeCl_4$, $SnCl_4$, $PbCl_4$, NaBr, $GeBr_4$ and NaCl, and both groups being positioned alternately thereby forming an extremely stable intercalation compound, a resonant wavelength of the resonator corresponding to the distance between two molecule layers, and an exciting energy supplying means for supplying exciting energy to the intercalation compound so as to generate in the intercalation compound a standing wave, which is emitted as coherent radiation, said intercalation compound being produced by a process comprising placing the layer crystal compound in a heated atmosphere so as to intercalate the compound therein, and cooling the atmosphere compulsorily at a rate of 0.1 to 10° C./min.

2. A process for emitting coherent radiation which comprises supplying exciting energy to an optical resonator containing an intercalation compound from an exciting energy supplying means, and generating a standing wave in the intercalation compound, wherein the intercalation compound comprises a group of at least one atom layer as a host for forming a layer crystal substance and a group of at least one molecule layer of a compound as an intercalant, both groups being positioned alternately, the number of said at last one atoms layer being one or more, and said compound being selected from the group consisting of SiCl$_4$, GeCl$_4$, SnCl$_4$, PbCl$_4$, NaBr, GeBr$_4$ and NaCl so as to form an extremely stable intercalation compound.

3. A process for emitting coherent radiation according to claim 2, wherein the exciting light is supplied at an angle of 40° or less, said angle being defined as an angle between a line perpendicular to the atom layer of the intercalation compound and incident direction of the exciting light.

4. A device for emitting coherent radiation comprising: an optical resonator containing an intercalation compound comprising a group of at least one atom layer as a host for forming a layer crystal substance and a group of at least one molecular layer of a compound as an intercalant, said compound as an intercalant being selected from the group consisting of SiCl$_4$, GeCl$_4$, SnCl$_4$, PbCl$_4$, GeBr$_4$ and NaCl, and both groups being positioned alternately thereby forming an extremely stable intercalation compound, a resonant wavelength of the resonator corresponding to the distance between two molecule layers, and an exciting energy supplying means for supplying exciting energy to the intercalation compound so as to generate in the intercalation compound a standing wave, which is emitted as coherent radiation.

5. A device according to claim 4 wherein the exciting light is supplied so as not to being about Bragg reflection.

6. A device according to claim 4, wherein the exciting light is supplied at an angle of 40° or less, said angle being defined as an angle between a line perpendicular to the atom layer of the intercalation compound and the incident direction of the exciting light.

7. A device according to claim 4, wherein the intercalation compound has a pair of coverings at the side faces perpendicular to the atom layer thereof.

8. A device according to claim 4, wherein the intercalation compound has a covering on the whole surfaces thereof.

9. A device according to claim 4, wherein the intercalation compound has a pair of layers made from a substance having a higher atomic weight than that of carbon atom outside thereof in parallel to the atom layer of the intercalation compound.

10. An intercalation compound comprising: a group of at least one atom layer as a host for forming a layer crystal substance; and a group of at least one molecule layer of a compound as an intercalant, said compound as an intercalant being selected from the group consisting of SiCl$_4$, GeCl$_4$, SnCl$_4$, PbCl$_4$, NaBr, GeBr$_4$ and NaCl, wherein layers of the group of at least one atom layer and the group of at least one molecule layer are positioned alternately thereby forming an extremely stable intercalation compound.

11. An intercalation compound according to claim 10, wherein the layer crystal substance is graphite.

12. An intercalation compound according to claim 10, wherein said compound is SiCl$_4$.

13. An intercalation compound according to claim 10, wherein said compound is NaBr.

14. A device for emitting coherent radiation comprising: an optical resonator having an intercalation compound including a group of at least one atom layer as a host for forming a layer crystal substance and a group of at least one molecule layer of a compound as an intercalant, said compound being selected from a group consisting of SiCl$_4$ and NaBr, wherein layers of the group of at least one atom layer and the group of at least one molecule layer are positioned alternately thereby forming an extremely stable intercalation compound, and wherein a resonant wavelength of the resonator corresponds to the distance between two molecule layers; and an exciting energy supplying means for supplying exciting energy to the intercalation compound so as to generate in the intercalation compound a standing wave, which is emitted as coherent radiation.

15. A device according to claim 14, wherein the layer crystal substance is graphite.

16. A device according to claim 14, wherein said compound is SiCl$_4$.

17. A device according to claim 14, wherein said compound is NaBr.

* * * * *